March 14, 1961 E. P. WIGNER ET AL 2,975,115
BELLOWS SEAL ON REACTOR COOLANT TUBE
Filed May 14, 1946

Witnesses:
Herbert E. Metcalf
John H. Leonard

Inventor:
Leo A. Ohlinger
Eugene P. Wigner
Gale J. Young
By: Robert A. (signature)
Attorney

United States Patent Office 2,975,115
Patented Mar. 14, 1961

2,975,115

BELLOWS SEAL ON REACTOR COOLANT TUBE

Eugene P. Wigner, Princeton, N.J., and Leo A. Ohlinger and Gale J. Young, Chicago, Ill., assignors to the United States of America as represented by the United States Atomic Energy Commission Filed May 14, 1946, Ser. No. 669,526

1 Claim. (Cl. 204—193.2)

This invention relates to a neutronic reactor, particularly to a neutronic reactor in which fissionable material is accommodated in coolant tubes which extend through a mass of neutron moderating material encased in a sealed shell, and has to do with a new and improved sealed connection between the tube ends and the shell.

The principal object of the present invention is to provide a new and improved seal between the gas shell or container of a reactor and the coolant tubes which extend through the shell or container so that not only is effective sealing provided but also provision is made for thermal elongation and contraction of the tubes, removal of the tubes, and effective replacement of damaged or corroded tubes.

Figure 1:
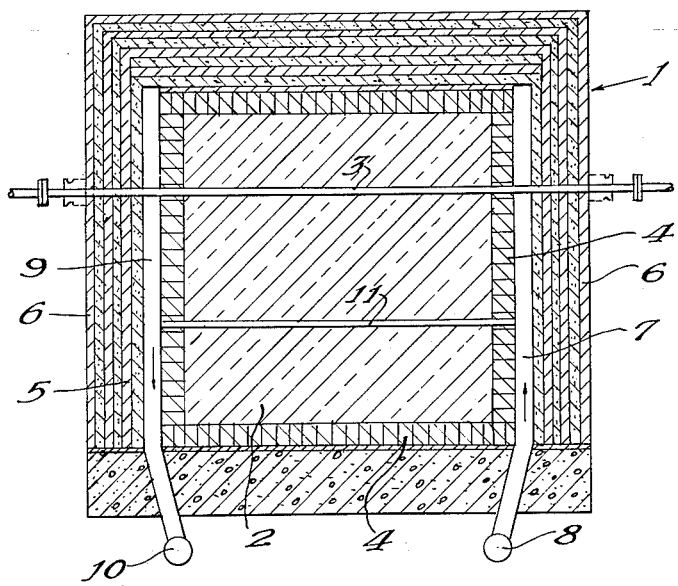
Figure 2:
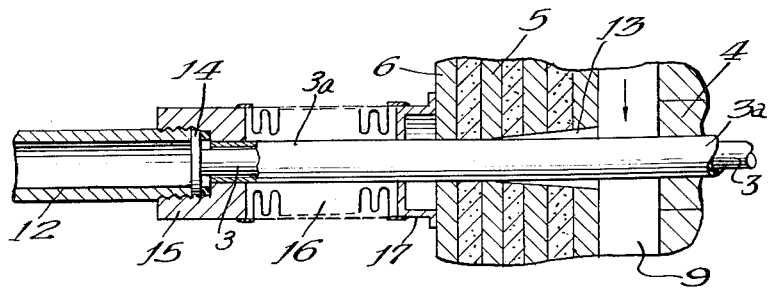

Other objects and advantages in addition to the foregoing will be apparent from the following description wherein reference is made to the drawings in which:

Fig. 1 is a diagrammatic vertical longitudinal sectional view, partly in elevation, of a reactor embodying the principles of the present invention; and Fig. 2 is an enlarged fragmentary vertical longitudinal sectional view of a portion of the reactor of Fig. 1, showing a coolant tube and its sealed connection to the shell in detail.

The present invention is disclosed herein as applied to a neutronic reactor of the type fully disclosed in the copending application of Robert M. Evans, Serial Number 649,407, filed February 21, 1946, its application to other types of reactors being apparent from the illustrative example.

The illustrative reactor 1 comprises a generally cubical mass 2 of graphite moderator which may be in the form of accurately machined and interfitted graphite blocks which are arranged in criss-cross layers with staggered joints so as to provide in effect a homogeneous graphite mass.

Certain of the blocks are provided with longitudinally extending passages which, when the blocks are assembled, extend from one end of the mass to the other and provide accurate passages which accommodate thin walled aluminum cooling tubes 3 in which fissionable material, such as uranium, is placed.

An iron thermal shield 4 encloses the moderator mass on all six faces. The moderator and its enclosing thermal shield are supported on a heavy foundation of concrete and, in turn, are enclosed on the sides and top by a biological shield 5 which may be formed of alternate layers of sheet steel and pressed hydrogenous material such as "Masonite" (compressed wood fiber), as illustrated, or of concrete. The shield 5 has an outer sealing wall 6 of sheet steel which is sealed at all the joints and extends across the bottom so as to form a gastight container or casing for the reactor. The shield 5 is spaced from the thermal shield 4 at the front and rear of the mass 2 so as to form an inlet chamber 7 into which helium under pressure is supplied from an inlet duct 8, and an outlet chamber 9 from which the helium is withdrawn through an outlet duct 10 for recirculation.

Longitudinal helium ducts 11, only one being indicated, are provided by bevelling off the longitudinal edges of certain of the blocks forming the mass 2 and extend through the moderator mass 2 in parallel spaced relation to the tubes 3 from the chamber 7 to the chamber 9. The flow of helium through these ducts is used to displace air and to scavenge water vapor from the moderator mass.

Various types of neutron absorbing control rods and safety rods extend into the mass 2 from the outside, as fully disclosed in said copending application, but are not disclosed herein as they form no part of the present invention.

The total length of the reactor between the front and rear outer face walls 6 of the biological shield not infrequently is over 30 feet. The aluminum tubes 3 fit the passages in the mass 2 with very slight clearance and extend through passages in the thermal shield 4, across the helium chambers 7 and 9, and through passages in the front and rear portions of the biological shield 5 and the outer sealing face walls of the gas shell 6. The end portions of the tubes 3 extend to the outside of the reactor. A steel sleeve or tube 3a surrounds tube 3 in the region through the shields. At both ends, the tubes 3 are provided with tubular extensions 12 which are coaxial therewith.

Rods or rod segments of uranium are charged into the tubes 3 through the extensions 12 from one end and discharged therefrom at the other end and cooling water under relatively high pressure is admitted through the extension 12 at one end and forced through the tubes around the rods and discharged through the extensions 12 at the other end. It is necessary to prevent the entry of any of this water into the mass 2 and to prevent the escape of helium from within the gas shell 6.

It is apparent from the foregoing description and from said copending application that several coexisting problems are presented in respect to sealing the outer ends of the tubes 3 with respect to the gas shell 6 and provision for their concurrent solutions must be made.

First, the passages through the shields must be slightly larger in diameter than the tubes 3 in order to permit removal and replacement of the tubes in event of tube failures, such as leakage or undue scaling or corrosion, or tube stoppage due to rod swelling, and the like.

At the same time, the escape of helium through the shield 5 around the tubes must be prevented, as also must the ingress of moisture.

Coexisting with these problems is that of providing for elongation and contraction of the tubes 3 due to thermal changes. Since the tubes may be as much as 30 to 40 feet in length, elongation and contraction is considerable and the thin walls of the tubes would buckle or distort easily if restrained and bind in the passages in the mass 2 and shields 4 and 5 were not provisions made to relieve the expansion.

The present invention provides an effective seal between the ends of the tubes 3 and the gas shell wall 6 and at the same time permits expansion of the tubes.

Referring particularly to Fig. 2, the shield 5 is provided with passages 13 which, at the ends adjacent chamber 9, are larger than the tubes 3 and which are tapered toward the outer ends for a portion of their length so that tubes 3 being inserted from either end of the reactor can be aligned more readily with and guided into the shield passages and to provide for any vertical or lateral displacement of the shield relative to the graphite mass. The remainder of each passage 13 and the portion extending through the steel wall 6 is cylindrical and only very slightly larger in diameter than the tubes 3.

The tubes 3 extend through the passages 13 and protrude beyond the face of the reactor. The outer end of each tube 3 is flared outwardly to form an integral radial flange 14 which abuts the end of the thick-walled extension 12. A clamping nut 15 surrounds the tube 3 and is in threaded engagement with the extension 12 for clamping the flange 14 firmly between the nut 15 and end of the extension 12 to form a water tight seal.

A bellows sleeve 16 surrounds the tube 3 between the wall 6 and nut 15. At one end the bellows is sealed to the nut 15 and at the other end is sealed to a member 17 which is sealed to the wall 6, the sealing preferably being by means of continuous welded joints. The member 17 may be omitted if desired and the bellows sleeve 16 sealed directly to the wall 6.

Thus, while providing for elongation and contraction of the tubes 3, effective seals are provided to prevent the entrance of moisture into the reactor and the escape of helium therefrom. At the same time, clear passages are provided for charging and discharging the tubes and for circulation of water therethrough around the rods of metal therein.

While the invention has been described in connection with a dry graphite moderator type of reactor, it is apparent that it may be used also with those reactors of the slurry and liquid moderator types wherein it is necessary for tubes to extend through the walls of the containers and shields.

Having thus described the invention what is claimed is:

In a neutronic reactor, a reactor casing, a tube extending through a wall thereof and having an end spaced from the exterior of the casing, a tubular extension engaging said end of the tube, a nut clamping the tubular extension to said end of the tube, and an axially expansible and contractible imperforate sleeve surrounding the portion of the tube exterior of the casing and being sealed at one end to the nut and at the other end to the wall.

References Cited in the file of this patent
UNITED STATES PATENTS

| | | |
|---|---|---|
| 611,508 | Quinn | Sept. 27, 1898 |
| 1,905,583 | Giesler | Apr. 25, 1933 |
| 2,185,450 | Wager | Jan. 2, 1940 |
| 2,366,809 | Seemann | Jan. 9, 1945 |
| 2,520,751 | Zucrow | Aug. 29, 1950 |
| 2,507,554 | Van Ackeren | May 16, 1950 |
| 2,565,296 | Chyle | Aug. 21, 1951 |

FOREIGN PATENTS

| | | |
|---|---|---|
| 788,452 | France | Oct. 10, 1935 |
| 473,518 | Great Britain | Oct. 14, 1937 |
| 233,011 | Switzerland | Oct. 2, 1944 |

OTHER REFERENCES

Kelly et al.: Phy. Rev. 73, 1135–39 (1948). Copy in Patent Office Library.